2 Sheets—Sheet 1.
N. E. HINDS.
HOP-KILNS.
No. 182,022.          Patented Sept. 12, 1876.
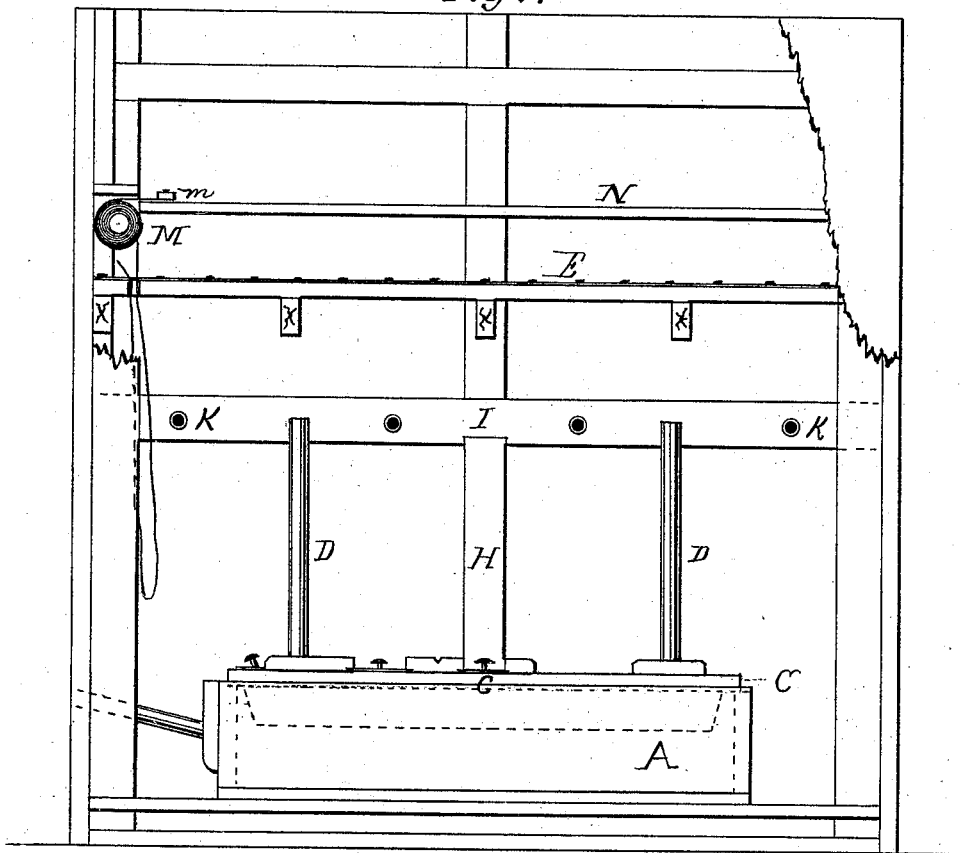
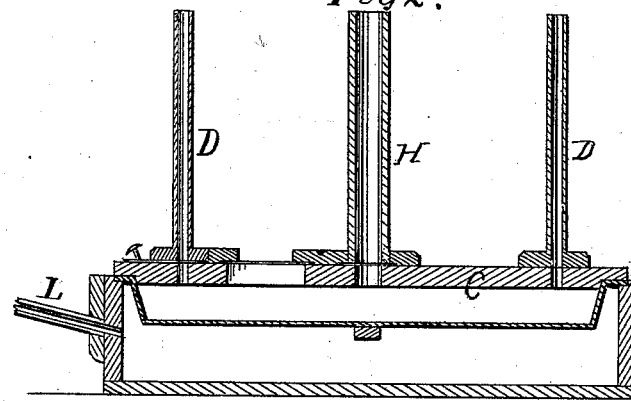
Witnesses:
Chas. C. Gill
W. Hensley
Inventor:
Nehemiah E. Hinds
By his atty.
Cox and Cox 2 Sheets—Sheet 2.
N. E. HINDS.
HOP-KILNS.
No. 182,022.  Patented Sept. 12, 1876.
Fig 3.
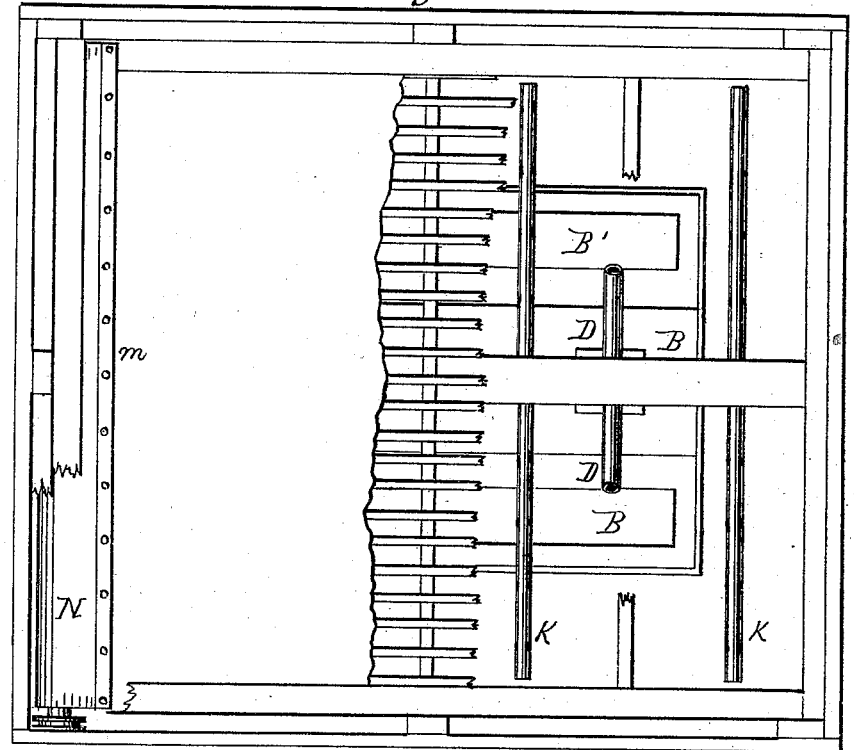
Fig 4.
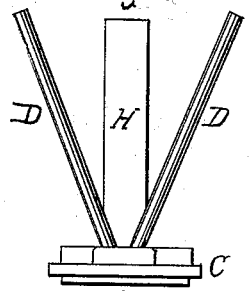
Fig 5.
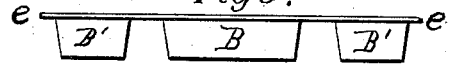
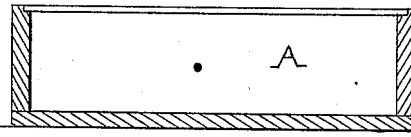
Witnesses:
Chas. O. Gill
W. Hendley
Inventor:
Nehemiah E. Hinds
By his attys.
Cox and Cox

UNITED STATES PATENT OFFICE.

NEHEMIAH E. HINDS, OF COOPERSTOWN, NEW YORK.

IMPROVEMENT IN HOP-KILNS.

Specification forming part of Letters Patent No. 182,022, dated September 12, 1876; application filed March 1, 1876.

*To all whom it may concern:*

Be it known that I, NEHEMIAH E. HINDS, of Cooperstown, Otsego county, New York, have invented a new and useful Improvement in Hop-Kilns, of which the following is a specification, reference being had to the accompanying drawings.

My invention relates to hop-kilns; and consists in a novel arrangement and combination of the furnace, steamer, pipes, and pans, whereby hops may be rapidly and effectively cured at reduced expense, and with less labor than heretofore.

A furnace of usual form is provided and placed in the kiln, upon the upper surface of which are set three pans, or a pan in three compartments, the middle pan or compartment being larger than those at the sides.

The pans or compartments are open, and above the middle one, conformed to completely close it, is a cover, provided near either end with steam-pipes, and at its center with an aperture, which is controlled by a slide, and is coincident with the mouth of a vertical pipe that leads to a heater provided with transverse arms, constructed to deliver the steam contiguous to the dry-cloth, and so as to reach substantially the entire lower surface thereof. A pipe is also provided whereby the steam may be permitted to escape from the kiln.

The details of construction and objects attained appear in the description of the parts and their offices hereinafter.

In the accompanying drawings, Figure 1 is a sectional elevation, in the nature of an end view of an embodiment of the invention. Fig. 2 is a detached sectional view of the furnace and pipes adjacent thereto. Fig. 3 is a top view. Fig. 4 is a detached view of the cover and pipes secured thereto. Fig. 5 is a like view of the pans.

A is the furnace, which is of any effective construction, and is placed inside the kiln. It has vertical sides, and is arranged with reference to the pans B B'. The pans B B' are of equal depth, the middle pan B being about three times as large as the side pans B'. The pans are provided with the horizontal rim e, and so constructed, with relation to the furnace, that when in place their sides and bottoms are within the walls of the furnace, and their contents thus very effectively exposed to the direct action of the heat, as shown at Fig. 2.

The pans may be connected, as in the present instance, or constructed in compartments, at pleasure.

Fitting upon the pan B is the cover C, provided near either end with apertures, in which are fitted the inclined pipes D, the upper extremities of which are contiguous to the dry-cloth E. In the middle of the cover C is an aperture, which is opened or closed by the slide c, above which is the mouth of the vertical pipe H, which is of greater diameter than any of the other pipes employed, and which is connected at its upper end with the hollow heater I, immediately below the dry-cloth E. Upon both sides of the heater I, and connected therewith, are the transverse pipes K, having numerous apertures, whereby the steam is delivered at divers points below the cloth. L is an escape-pipe, by means of which the steam may be removed entirely from the kiln. M is a roller, to which the upper cloth is attached, one edge of the cloth being fastened upon the bar m, which rests upon the strip N secured to the frame of the kiln, thus permitting any desired adjustment.

In the operation of the invention the small pans are used without regard to the middle one, as may appear to be expedient, either to increase the volume of steam for burning the brimstone, to dry the hops, or otherwise.

What I claim as my invention, and desire to secure by Letters Patent, is—

1. In a hop-kiln, the combination of the pan B, cover C, pipe H, having slide c, and heater I, provided with the perforated pipes K, substantially as and for the purpose set forth.

2. In a hop-kiln, the combination of the pan B, cover C, pipes D, pipe H, having slide c, and heater I, having perforated pipes K, substantially as and for the purpose set forth.

In testimony that I claim the foregoing improvement in hop-kilns, as above described, I have hereunto set my hand and seal this 22d day of January, 1875.

NEHEMIAH E. HINDS. [L. S.]

Witnesses:
 HENRY C. HINDS,
 FRED. L. PALMER.